(12) United States Patent
Scott et al.

(10) Patent No.: US 7,082,500 B2
(45) Date of Patent: Jul. 25, 2006

(54) OPTIMIZED HIGH BANDWIDTH CACHE COHERENCE MECHANISM

(75) Inventors: Steven L. Scott, Eau Claire, WI (US); Abdulla Bataineh, Eau Claire, WI (US)

(73) Assignee: Cray, Inc., Chippewa Falls, WI (US)

( * ) Notice: Subject to any disclaimer, the term of this patent is extended or adjusted under 35 U.S.C. 154(b) by 532 days.

(21) Appl. No.: 10/368,090

(22) Filed: Feb. 18, 2003

(65) Prior Publication Data

US 2004/0162949 A1 Aug. 19, 2004

(51) Int. Cl.
*G06F 12/00* (2006.01)

(52) U.S. Cl. .................. 711/141; 711/142; 711/143; 711/144

(58) Field of Classification Search .................. None
See application file for complete search history.

(56) References Cited

U.S. PATENT DOCUMENTS

| | | | | |
|---|---|---|---|---|
| 5,265,232 | A | 11/1993 | Gannon et al. ............. | 395/425 |
| 5,634,110 | A | 5/1997 | Laudon et al. ............. | 395/472 |
| 5,680,576 | A * | 10/1997 | Laudon ...................... | 711/145 |
| 5,752,258 | A | 5/1998 | Guzovskiy et al. ......... | 711/120 |
| 5,778,437 | A | 7/1998 | Baylor et al. ............... | 711/141 |
| 5,787,477 | A | 7/1998 | Rechtschaffen et al. .... | 711/141 |
| 5,900,015 | A | 5/1999 | Herger et al. ............... | 711/141 |
| 5,937,431 | A * | 8/1999 | Kong et al. .................. | 711/145 |
| 6,631,447 | B1 * | 10/2003 | Morioka et al. ............ | 711/141 |
| 6,651,145 | B1 * | 11/2003 | Jamil et al. ................. | 711/144 |
| 6,748,498 | B1 * | 6/2004 | Gharachorloo et al. ..... | 711/141 |

OTHER PUBLICATIONS

Chaiken, D., et al., "LimitLESS Directories: A Scalable Cache Coherence Scheme", *Proceedings: Fourth International Conference on Architectural Support for Programming Languages and Operating Systems*, Santa Clara, CA,(Apr. 8-11, 1991),224-234.

Laudon, J., et al., "The SGI Origin: A ccNUMA Highly Scalable Server", *Computer ARchitecture News*, vol. 25, No. 2, XP000656582, (May 1997),241-251.

Lenoski, D., et al., "The Directory-Based Cache Coherence Protocol for the DASH Multiprocessor", *Proceedings: The 17th Annual International Symposium on Computer Architecture*, Seattle, Washington,(May 28-31), 148-159.

(Continued)

*Primary Examiner*—T Nguyen
(74) *Attorney, Agent, or Firm*—Schwegman, Lundberg, Woessner & Kluth, P.A.

(57) ABSTRACT

A method and apparatus for a coherence mechanism that supports a distributed memory programming model in which processors each maintain their own memory area, and communicate data between them. A hierarchical programming model is supported, which uses distributed memory semantics on top of shared memory nodes. Coherence is maintained globally, but caching is restricted to a local region of the machine (a "node" or "caching domain"). A directory cache is held in an on-chip cache and is multi-banked, allowing very high transaction throughput. Directory associativity allows the directory cache to map contents of all caches concurrently. References off node are converted to non-allocating references, allowing the same access mechanism (a regular load or store) to be used for both for intra-node and extra-node references. Stores (Puts) to remote caches automatically update the caches instead of invalidating the caches, allowing producer/consumer data sharing to occur through cache instead of through main memory.

7 Claims, 5 Drawing Sheets

OTHER PUBLICATIONS

Lenoski, D., et al., "The Stanford Dash Multiprocessor", *Computer, 25*, (Mar. 1992),63-79.

Morris, John, "Computer Architecture: The Anatomy of Modern Processors", Internet Website: Http://ciips.ee.uwa.edu.au/~morris/CA406/cache_coh.html on Apr. 29, 2002, (1998),6 pgs.

Papamarcos, M.S., et al., "A Low-Overhead Coherence Solution for Multiprocessors with Private Cache Memories", *Proceedings: The 11th Annual International Symposium on Computer Architecture*, Ann Arbor, Michigan,(Jun. 5-7, 1984),348-354.

Scott, Steve L., et al., "Performance of Pruning-Cache Directories for Large-Scale Multiprocessors", *IEEE Transactions on Parallel and Distributed Systems*, vol. 4, No. 5,(1993),pp. 520-534.

Scale Multiprocessors, *IEEE Transactions on Parallel and Distributed Systems,* vol. 4, No. 5, (1993), pp. 520-534.

\* cited by examiner

OPTIMIZED HIGH BANDWIDTH CACHE COHERENCE MECHANISM

FIELD

An embodiment of the invention relates generally to a cache coherence protocol in a multi-processor system.

BACKGROUND

Computers read, store, and manipulate data in memory. Ideally, a computer would have a singular, indefinitely large and very fast memory, in which any particular data would be immediately available to the computer. In practice, this is not practical because memory that is very fast is also very expensive.

Thus, computers typically have a hierarchy (or levels) of memory, each level of which has greater capacity than the preceding level, but which is also slower with a less expensive per-unit cost. Keeping frequently-needed data in a small but fast level of memory and infrequently-needed data in a slow level of memory can substantially increase the performance of a computer.

Another way to increase performance is to use multiple processors executing simultaneously, each with their own cache (fast level of memory) but sharing data. The caching of shared data among multiple processors introduces a new problem: cache coherence, that is if multiple processors each have a cached copy of data from a shared memory location, all of those cached copies need to be the same.

To ensure cache coherence, multi-processors systems use a technique called a cache coherence protocol. In a conventional coherence protocol, a write from a first processor's memory to a second processors's memory would go through the following steps: first processor performs a write, which results in a miss in a cache local to the first processor. A request is sent to a node of a second processor, which consults a directory. A controller for the send processor reads the target line from either from memory or from a cache local to the second processor and sends the line to the first processor, where the line is saved in the first processor's cache, modified, and marked as dirty. Later, the second processor reads the memory location written by the first processor, misses in the second processor's local cache, and consults the second processor's directory, which forwards the request to the first processor, which reads the dirty line from the first processor's cache. The line is sent to the second processor where it is written into the second processor's cache, and optionally into the second processor's memory.

Thus, in this scenario, four network traversals are performed, and the entire line is copied first from the second processor to the first processor, and then from the first processor back to the second processor. This is very inefficient, especially if the first processor merely wanted to send the second processor a single word.

SUMMARY

The coherence mechanism supports a distributed memory programming model (in which processors each maintain their own memory area, and communicate data between them) without the overhead required to support global caching of data values. Moreover, since a modest caching domain is implemented (allowing a line to be cached by a number of processors within a caching domain), a hierarchical programming model is supported, which uses distributed memory semantics on top of shared memory nodes with a small number of processors per node. Coherence is maintained globally, but caching is restricted to a local region of the machine (a "node" or "caching domain"). In an embodiment, a directory cache is held entirely in an on-chip cache and is multi-banked, allowing very high transaction throughput. Directory associativity allows the directory cache to map contents of all caches concurrently. References off node are converted to non-allocating references, allowing the same access mechanism (a regular load or store) to be used for both for intra-node and extra-node references. Stores (Puts) to remote caches automatically update the caches instead of invalidating the caches, allowing producer/consumer data sharing to occur through cache instead of through main memory.

DETAILED DESCRIPTION

Figure 1:
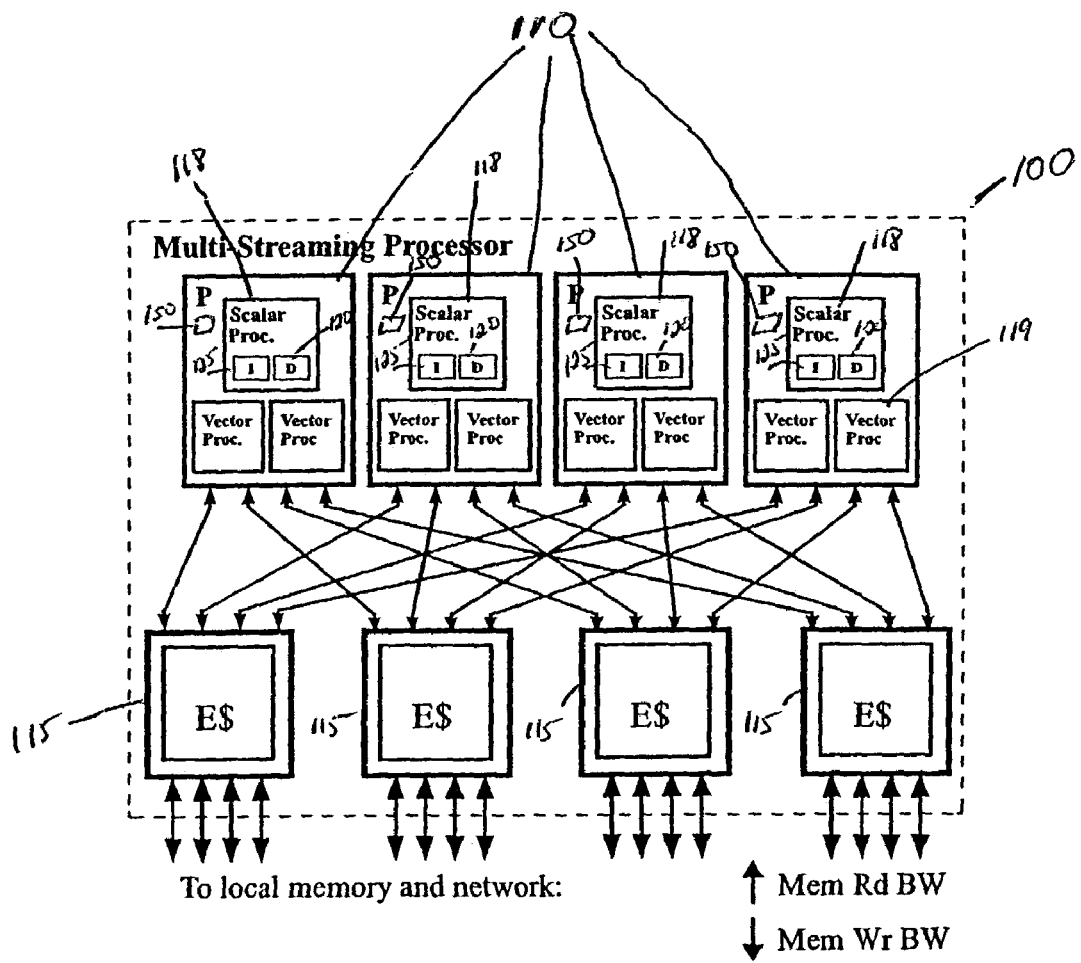
FIG. 1 depicts a block diagram of a multi-streaming processor, according to an embodiment of the invention.

FIG. 1 depicts a block diagram of a single multi-streaming processor (MSP) 100, which in an embodiment is implemented as an 8-chip multi-chip module (MCM) and includes 4 processors (P) 110 and four Ecache (E) chips 115. Memory is logically shared, but physically distributed with the processors in the system. Each processor 110 may include a scalar processor 118 and vector processors 119. The scalar processors 118 may have on-chip instruction caches 125 that are 2-way set associative in an embodiment. The scalar processors 118 may each have an on-chip data cache 120. Load instructions can bypass the on-chip data cache 120 (no allocate). One processor 100 with its scalar processor 118 and two vector processors is referred to as a SSP (Single-Streaming Processor). Each processor 110 may also include a cache coherence controller 150, which performs the cache coherence protocol, as further described below.

The Dcache 120 functions in write-through mode, and is kept coherent with the Ecache 115 through selective invalidations performed by the Ecache 115. The Dcache 120 is a data cache. The Ecache 115 is a frontside cache shared by all the processors 110 and is used for scalar, vector, and instruction data. Each Ecache chip may have system ports to the local memory and network. The Ecache 115 is responsible for enforcing ordering of vector and scalar memory references as dictated by local memory synchronization instructions.

Figure 2:
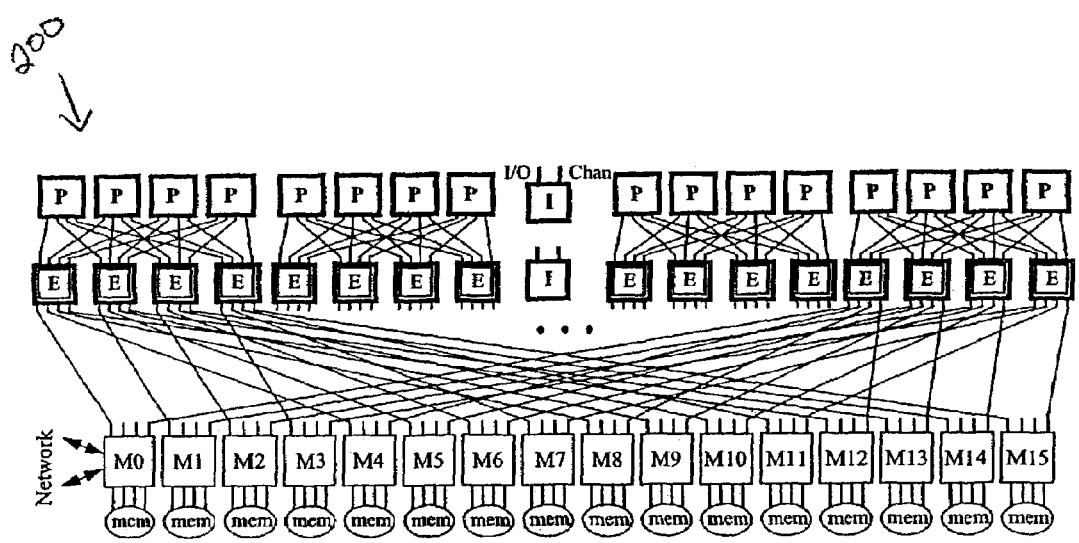
FIG. 2 depicts a block diagram of a node of multi-streaming processors, according to an embodiment of the invention.

FIG. 2 shows a 16 SSP/4 MSP node 200, which in an embodiment may be contained on a single printed circuit board. The system building block is a 4-MSP node (a node is the group of processors and memory over which memory bandwidth and latency are uniform for all processors on the node), which is contained on a single printed circuit board. In an embodiment, routers may be placed on separate boards, allowing for customization of the network. In another embodiment, small systems may be built without routers.

The sixteen M chips on a node may contain memory controllers, network interfaces and cache coherence directories with their associated protocol engines. In an embodiment, the memory system is sliced across the 16 M chips, round robin by 32-byte cache lines; each M chip supports one slice.

In an embodiment, each M chip resides in one of sixteen independent address slices of the machine, and the interconnection network may provide connectivity only between corresponding M chips on different nodes. All activity (cache, memory, network) relating to a line of memory stays within the corresponding slice. Each M chip controls a separate sector of a slice. Slices expand (get more memory in each) as nodes are added so the number of sectors in each slice is equal to the number of nodes in system. In an embodiment, each M chip may contain two network ports.

Virtual addresses used for instruction fetches and data references are first translated into physical addresses before memory is accessed. Two forms of address translation are supported: source translation and remote translation. In source translation, a virtual address is fully translated by a translation look aside buffer (TLB) on the local P chip to a physical address on an arbitrary node. A TLB is a cache of page table entries, which is loaded on demand under software control. In an embodiment, each P chip may contain three separate TLBs, for translating instructions, scalar references, and vector references, respectively. The three TLBs are independent, and may contain different sets of page table entries. Each is eight-way set associative, and contains 256 total entries in an embodiment. The vector TLB is replicated four times for bandwidth purposes, but will contain identical data under normal operation.

The cache coherence protocol consists of a set of cache line states in the Dcache, Ecache and directory, a set of messages sent between entities, and a set of state transitions on message and program events.

The cache coherence protocol has the following attributes:

1. Caching is restricted to the local node (4 MSPs). The entire machine is cache coherent, but references to memory off node do not cause allocations in the local Dcache and Ecache.
2. Blocking protocol. No retry nacks are used. Packets that cannot be processed can back up the network on their virtual network. Deadlock is avoided by guaranteeing that packet dependency chains are acyclic.
3. Three virtual networks are used. The longest virtual network dependency chain is (1) request from Ecache to directory, (2) forwarded request to Ecache, and (3) response by that Ecache to the directory. In an embodiment, the three virtual networks are called VN0, VN1 and VN2. Due to attribute traffic is only intra node (not inter node).
4. No hardware Icache coherence is used. The D and Ecaches are kept coherent automatically, but the Icache requires explicit flushing by software when there is a possibility that the contents are stale. Instruction fetches are always allocated in the Icache. The ITLB cache allocation hints control Ecache allocation.
5. All transient directory entries have an associated hardware timer for aborting the transaction in the event of a lost packet. Stalled directory transactions cannot block other, unrelated directory transactions, as they only stall VN 0, and directory transactions require only VN 1 and VN 2 packets to complete.
6. The protocol uses in-order delivery of certain packets by the network. To simplify the protocol, the network delivers packets in order for the same cache line address on the same virtual network between a sender/receiver pair.
7. The protocol uses segregation of traffic on different virtual channels in the network. Since request traffic can be stalled waiting for a particular response packet to free up a cache line, individual response packets are not mingled with request traffic.
8. The directory tracks Ecaches only (not Dcaches). Each Ecache maintains inclusion over its local Dcaches using a 4-bit bitvector associated with the state of each line.
9. The protocol is optimized for migratory and private data access over read sharing. The first read goes to Exclusive rather than Shared state (unless specifically requested in Shared state by the processor). Thus, a subsequent write to that line by a processor at the same Ecache is not stalled, but a subsequent read by a different processor must be forwarded.
10. The protocol supports external update of exclusive lines. A Put (non-allocating write) will update a line cached exclusively by another MSP (rather than invalidating it). This reduces read latency for producer/consumer data sharing.
11. The protocol supports replacement notifications for shared evictions. The Ecache notifies the directory when it evicts a shared line. If all sharers evict the line, then the directory entry for the line reverts back to the Uncached state.
12. Invalidates are collected at the directory, which allows packets to be evicted from an Ecache at any time, and there is no state at the Ecache associated with individual writes that have not completed their invalidations.
13. The directory is sufficiently associative to track any combination of sharers. Since the directory is 8-way associative and tracks lines kept in four 2-way-associative caches, it can hold entries for whatever the Ecaches can contain. Temporary set overflows can result from new Ecache requests that beat old eviction notifications to the directory, but these are resolved by holding off the new request until the eviction arrives.
14. Non-unit stride, allocating vector references bring in the whole line, which exploits possible spatial locality. Non-allocate loads transfer only the requested words.
15. The protocol supports both allocating and non-allocating read and write requests. Non-allocating references do not bypass the cache. They simply do not allocate in the event of a miss. Both types of requests can be supported concurrently by the protocol, preserving request ordering and cache coherence, while allowing better optimization of the cache resources.

Directory Pointer Structure

Each entry in a directory cache consists of a tag field indicating the memory line to which the entry refers, a state field indicating the global state of the line, and a sharing vector that points to Ecaches that have cached a copy of the line. The directories track caching on an Ecache, rather than a processor granularity.

Caching of each line of memory is restricted to those Ecaches on the local, node.

In the global Exclusive state, only one Ecache has a cached copy of a line, and thus the sharing vector for that line will contain exactly one set bit. In the global Shared state, multiple Ecaches may have cached a copy of a line, and thus multiple bits may be set in the sharing vector. At the time a Shared line is invalidated, the directory sends invalidations to all Ecaches indicated in the association directory entry's sharing vector.

Hardware in the P chip automatically forces all references to memory outside the node to be non-allocating. This feature is functionally invisible to software, effecting performance only. The entire machine is still cache coherent. Atomic memory operations are still supported across the entire machine, as are load/store references, which are not cached outside the local node.

Coherence States

Local States

Table 1 lists the possible states associated with a line in the Ecache. The PendingReq state indicates that a request has been sent to the directory for this line. Information about the processor request that caused the directory request is saved in a local buffer, and the line is unavailable for further requests until the directory request is satisfied. In the WaitForVData and WFVDInvalid state, a VWrite packet has been processed, but the matching VWriteData packet has not. The line is unavailable for other requests until the data is written.

TABLE 1

Ecache States

| Local State | Description |
| --- | --- |
| Invalid | Local copy is invalid (absent lines are considered to be in the invalid state) |
| ShClean | Local copy is clean, but not exclusive. Processor does not have write permission. |
| ExClean | Local copy is exclusive and clean. |
| Dirty | Local copy is exclusive and dirty. |
| PendingReq | Waiting for response to a request that was sent to the directory due to a local processor request. |
| WaitForVData | Processed a VWrite (address-only) message, waiting for the VWriteData. |
| WFVDInvalid | Line was stolen by an external intervention while in the WaitForVData state. Just like the WaitForVData state, but treat line as Invalid when the VWriteData packet is processed. |

In addition to this state, each line in the Ecache includes a mask indicating whether the line has been read by each of the four local processors. If all bits are zero in this mask, then the line is not cached in any of the local Dcaches. If any bits are set, then the associated Dcaches may contain a copy of the line.

Two other masks are maintained by the Ecache for transient lines. A sword mask is used for scalar stores that caused allocations. The data for the store is placed in the cache, and when the ReadExclResp arrives from memory, the mask is used to avoid overwriting this data.

Another mask is created when entering WaitForVData state or "PendingReq state on a vector store. This mask keeps track of words that are going to be written by the vector store. Subsequent vector or scalar stores that get placed into the Replay Queue merge their masks into this mask, so it keeps a running record of dwords that are scheduled to be written. Then, in WaitForVData state, a load to the line can be serviced if it does not overlap with any of the to-be-stored dwords. This allows loads of a partial cache line to proceed in the event that stores to the other half of the same cache line from a previous loop iteration have not completed. This mask is cleared when a VWriteData packet takes the line back to the Dirty state. At this time, any matching requests in the Replay Queue are replayed, allowing them to reset the mask, if appropriate.

Table 2 lists the possible states associated with a line in the Dcache. Since the Dcache is write through, lines are never "dirty." The Ecache takes care of obtaining write permission and enforcing global write serialization. Thus, the Dcache makes no distinction between shared and exclusive data.

TABLE 2

Dcache States

| Local State | Description |
| --- | --- |
| Invalid | Local copy is invalid (absent lines are considered to be in the invalid state) |
| Valid | Local copy is valid. |

The Dcache itself also makes no distinction between valid and pending lines. Lines are marked valid as soon as they are allocated. An associative match against earlier queued requests, however, informs a new request when a valid line has not yet returned from the memory system, in which case the new request is queued behind the earlier request that initiated the Dcache fill.

Global States

Table 3 lists the states associated with memory lines at the directory. The states in the second half of the table are transient, and are used for cache lines involved in outstanding transactions. Those are only needed for entries in the transient directory buffer.

TABLE 3

Global Directory State Description

| State | Description |
| --- | --- |
| Noncached | Memory's copy valid. No cached copies. |
| Shared | Memory's copy valid. Multiple processor's within a single node have clean copies. Additional state encodes processor pointers. |
| Exclusive | Memory's copy may be invalid. One processor has (possibly dirty) copy. Directory holds pointer to processor with data. |
| PendInvlPut | Waiting for InvalAcks (follow-up WriteComplete and write directory Noncached) |
| PendInvalWrite | Waiting for InvalAcks (follow-up WriteComplete and write directory Exclusive) |
| PendFwd | Waiting for current owner to respond to forwarded request. |
| PendDrop | A Read request arrived at the directory from the Ecache listed as a Shared owner. A Drop from that Ecache must be in flight on VN2. Serve the request but wait for the matching Drop and ignore it. |
| PendMemInvWrite | Line is locked while we wait for the memory manager to service a ReadMod. Will transition to the PendInvalWrite state. |
| PendMemInvPut | Line is locked while we wait for the memory manager to service a Put or AMO. Will transition to the PendInvalPut state. |
| PendMemExculsive | Line is locked while we wait for the memory manager to service a Read or ReadMod. Will transition to the Exclusive state. |

Coherent Message Types

The cache coherence protocol uses a variety of message types, as described below.

Local (Intra-Processor) Messages

Table 4 and Table 5 list the coherence protocol messages used between the P and E chips. In the P-to-E direction, all requests are sent on the same virtual channel except vector write data, which has its own virtual channel. Both of these virtual channels are flow controlled, and may block on VN0. Only a single virtual channel is used for E-to-P packets, and it is not flow controlled.

TABLE 4

Processor to Ecache Messages

| Message | Description |
|---|---|
| Read | Request a cached copy of line (scalar load) |
| ReadShared | Request a cached copy of line (scalar load). Ecache should request Shared. |
| ReadMod | Request a cached copy of line (scalar write). Ecache should request Exclusive. |
| ReadUC | Request an uncached copy of all or part of a line (vector load). Data should be cached by the Ecache. |
| ReadUCShared | Request an uncached copy of all or part of a line (vector load). Ecache should request Shared. |
| ReadNA | Request an uncached copy of all or part of a line (scalar or vector load). Ecache should not allocate on a miss. |
| SWrite | Store data from a scalar write through. Ecache should allocate on miss (which would happen only if there was a race with an incoming Inval and an outgoing SWrite; otherwise the line will be in the Ecache in an exclusive state due to earlier ReadMod request) |
| SWriteNA | Store data from a non-allocating scalar store. Ecache should not allocate on a miss. |
| VWrite | Store request (address only) from a vector store. Ecache should allocate on miss. |
| VWriteNA | Store request (address only) from a non-allocating vector store. Ecache should not allocate on a miss. |
| VWriteData | Vector store data to be matched with an earlier vector store request. |
| AMO | A read-modify-write atomic operation. |
| MsyncMarker | Wait for mates, flush requests at banks, then respond. |
| GsyncMarker | Wait for mates, flush requests at banks, wait for global write completion, then respond. |

All read packets include masks indicating which of the swords within a cache line are requested, and transaction IDs (TIDs), which are returned with responses to match them with the corresponding requests. Write packets similarly contain a mask indicating which of the swords within a cache line are to be written to memory. The coherence protocol does not distinguish packets based upon either mask or TID.

TABLE 5

Ecache to Processor Messages

| Message | Description |
|---|---|
| ReadResp | Return part or all of one cache line. May be destined to A, S or V registers, the Dcache or the Icache. |
| Inval | Invalidate a line in the Dcache. |
| SyncComplete | Indicate that Msynch or Gsynch is complete. |

Global Messages

Table 6 lists messages sent by the Ecache to the directory. The VN column indicates on which virtual network the packet is sent. The VN2 packets are only sent to a local directory, not across the interconnection network.

TABLE 6

Ecache to Directory Messages

| Message | Description | VN |
|---|---|---|
| Read | Request a copy of line (read miss). | 0 |
| ReadShared | Request a copy of line with hint that line will be shared. | 0 |
| ReadMod | Request an exclusive copy of line (write miss). | 0 |
| Get | A non-cached load request. | 0 |
| Put | A non-cached store request. | 0 |
| AMO | Any form of read-modify-write atomic operation. | 0 |
| Drop | Notify directory of ShClean eviction. | 2 |

TABLE 6-continued

Ecache to Directory Messages

| Message | Description | VN |
|---|---|---|
| WriteBack | Write back dirty line, relinquishing ownership. | 2 |
| Notify | Notify directory of ExClean eviction. | 2 |
| SupplyInv | Supply clean line to directory, local copy invalid | 2 |
| SupplyDirtyInv | Supply dirty line to directory, local copy invalid | 2 |
| SupplySh | Supply clean line to directory, local copy shared | 2 |
| SupplyDirtySh | Supply dirty line to directory, local copy shared | 2 |
| SupplyExcl | Supply line to directory, local copy exclusive (may be dirty) | 2 |
| FlushAck | Acknowledge receipt of FlushReq or forwarded request. Used when no data to return because of a race. | 2 |
| UpdateAck | Acknowledge successful receipt of an Update. | 2 |
| UpdateNack | Couldn't accept Update, returning dirty line to directory. | 2 |
| InvalAck | Acknowledge receipt of an invalidate. | 2 |
| GetResp | Sent in response to an E chip MMR Get only. | 2 |
| WriteComplete | Sent in response to an E chip MMR Put only. | 2 |

Table 7 lists messages sent by the directory to an Ecache.

TABLE 7

Directory to Ecache Messages

| Message | Description | VN |
|---|---|---|
| Update | Update an Exclusive line (from a Put). | 1 |
| FwdGet | Request that owner supply line. Stay Exclusive. | 1 |
| FwdRead | Request that owner supply line. Transition to Shared state if clean, Invalid if dirty. | 1 |
| FwdReadShared | Request that owner supply line. Transition to Shared state. | 1 |
| FlushReq | Request that owner supply line. Transition to Invalid. | 1 |
| Inval | Invalidate shared line. | 1 |
| ReadSharedResp | Return line in shared state. | 1 |
| ReadExclResp | Return line in exclusive state (includes WriteComplete bit) | 1 |
| GetResp | Return non-cached response to Get or AMO (includes WriteCompare bit) | 1 |
| WriteComplete | Inform writer that write/Put has completed. | 1 |
| Get | Sent to local E chip MMR only. | 1 |
| Put | Sent to local E chip MMR only. | 1 |

In Table 11 and Table 13, the notation "C=0" or "C=1" indicates the state of the WriteComplete bit in ReadExclResp and GetResp packets. Ecaches receiving these packets interpret a set WriteComplete bit as a piggybacked WriteComplete packet, and decrement the appropriate outstanding write counter.

Simplified Coherence Protocol

Table 8 shows a simplified version of the cache coherence protocol assuming no race conditions and ignoring intra-processor details. For each basic processor request, the table shows the expected new state of the corresponding line after the request has been satisfied, depending upon the current state of the line.

TABLE 8

Simplified Coherence Protocol

| Request by Processor X | Noncached | Current cache line state | | |
|---|---|---|---|---|
| | | ExClean Somewhere | Dirty Somewhere | Shared |
| Read | ExClean at X | Shared | ExClean at X | Shared |
| Read (Shared hint) | Shared at X | Shared | Shared | Shared |
| Write | Dirty at X | Dirty at X | Dirty at X | Dirty at X |
| Get (non-allocate read) | Noncached | Remain ExClean at current owner | Remain Dirty at current owner | Shared |
| Put (non-allocate write) | Noncached | Dirty at current owner | Remain Dirty at current owner | Noncached |
| AMO | Noncached | Noncached | Noncached | Noncached |

Processor Requests and Dcache State Transitions

The processor generates both scalar and vector memory requests. Vector requests are sent directly to the Ecache. They include a hint field that specifies the desired Ecache allocation behavior. Table 9 shows the messages that are sent to the Ecache for different vector memory requests. Vector read responses from E to P are sent as ReadResp messages.

TABLE 9

Vector Memory Requests

| Request Type | Message(s) Sent to Ecache |
|---|---|
| Vector read | ReadUC |
| Vector read with Shared hint | ReadUCShared |
| Vector read with non-allocate hint | ReadNA |
| Vector write (address and data sent separately) | VWrite, VWriteData |
| Vector write with non-allocate hint (address and data sent separately) | VWriteNA, VWriteData |

Scalar memory references do not include an allocation hint in the instruction, but acquire a hint from the Hint field of the TLB entry used to translate the virtual address. The hints include allocate exclusive (the typical case), allocate shared (useful for shared read-only data), and no allocate (useful for remote memory used for explicit communication or for data accessed with no temporal locality).

The Dcache itself contains only two states: valid and invalid. Scalar memory requests are initially checked both against the Dcache, and associatively against a queue of previous scalar requests which have not yet been serviced. All requests in this queue are serviced in order to the Dcache and the Ecache. It is thus called the forced order queue (FOQ).

If a new request does not match the address of any request in the FOQ, then the request may immediately access the Dcache (on a read hit) or send a message to E (on a read miss or an allocating write miss).

If a request detects a possible match in the FOQ (only a subset of the address is matched), then the request is queued behind the earlier requests to maintain ordering. Write requests are always run through the FOQ, and cannot be dequeued until their write data is present and they are committed. Requests that initiate Dcache fills from the Ecache are additionally placed into the FOQ, pending the response from E.

Table 10 presents a high-level overview of the Dcache operation. It abstracts away the details of the implementation, and does not describe the handling of synch instructions, or the Dcache bypass mode used in the shadow of an Msync instruction. Where the action states that the request is queued, it simply means that the request is run through the FOQ before being sent to the Dcache and/or Ecache.

TABLE 10

High Level View of Dcache Transactions

| Old State | Request | Match | Action | New State |
|---|---|---|---|---|
| Invalid | Read | No | Send Read to E | Valid |
| | | Yes | Queue ReadUC to E | Invalid |
| | ReadNA | No | Send ReadNA to E | Invalid |
| | | Yes | Queue ReadNA to E | Invalid |
| | Write | No | Send ReadMod to E, queue Swrite to Dcache and E | Valid |
| | | Yes | Queue SWrite to E | Invalid |
| | WriteNA | No | Queue SWriteNA to E | Invalid |
| | | Yes | Queue SWriteNA to E | Invalid |
| Valid | Read | No | Satisfy from Dcache | Valid |
| | | Yes | Queue read from Dcache | Valid |
| | ReadNA | No | Satisfy from Dcache | Valid |
| | | Yes | Queue read from Dcache | Valid |
| | Write | No | Queue SWrite to Dcache and E | Valid |
| | | Yes | Queue SWrite to Dcache and E | Valid |
| | WriteNA | No | Queue SWrite to Dcache and E | Valid |
| | | Yes | Queue SWrite to Dcache and E | Valid |
| | Vector Write | — | — | Invalid |
| | External Inval | — | — | Invalid |
| | Eviction | — | — | Invalid |

Ecache State Transitions

Table 11 shows the Ecache state transactions that occur when processing messages from the scalar processor, vector processor or network. The Ecache keeps necessary information to respond to scalar and vector requests once messages return from the directory.

TABLE 11

Ecache State Actions on Message Events

| Old Ecache State | Message from P or M chip | Action | New Ecache State |
|---|---|---|---|
| (all states) | WriteComplete | Decrement outstanding write counter (--wc) | Same |
| (all states) | AMO | Send AMO to directory, increment outstanding write counter (++wc), if result-returning AMO (afadd, afax, acswap), then increment outstanding read counter (++rc) | Same |
| (all states) | MMR read | Send Get to M chip or E chip local block, ++rc | Same |
| (all states) | MMR write | Send Put to M chip or E chip local block, ++we | Same |
| (all states) | Scalar IO read | Send Get to M chip via bank 0, port 0, ++rc | Same |
| (all states) | Scalar IO write | Send Put to M chip via bank 0, port 0., ++wc | Same |
| (all states) | Vector IO read | Send Get to M chip, ++rc | Same |
| (all states) | Vector IO write | Mark the cache index as waiting for vector data | Same |
| (all states) | Vector IO write data | Send Put to M chip, ++wc, un-mark the cache index | Same |
| Invalid | Read | Send Read to directory, ++rc, set inclusion bit | PendingReq |
| Invalid | ReadUC | Send Read to directory, ++rc | PendingReq |
| Invalid | ReadShared | Send ReadShared to directory, ++rc, set inclusion bit | PendingReq |
| Invalid | ReadUCShared | Send ReadShared to directory, ++rc | PendingReq |
| Invalid | ReadMod | Send ReadMod to directory, ++rc, ++wc, set inclusion bit | PendingReq |
| Invalid | ReadNA | Send Get to directory, ++rc | Invalid |
| Invalid | SWrite | Send ReadMod to directory, ++rc, ++wc, write Ecache and mask to merge in response data | PendingReq |
| Invalid | SWriteNA | Send Put to directory, ++wc | Invalid |
| Invalid | VWrite | Send ReadMod to directory, ++rc, ++wc | PendingReq |
| Invalid | VWriteNA | Mark the cache index as waiting for vector data, discard VWriteNA | Invalid |
| Invalid | VWriteData | Send Put to directory, ++wc, if the cache index is marked as waiting for vector data, then un-mark it | Invalid |
| Invalid | ReadSharedResp | Cannot occur | |
| Invalid | ReadExclResp | Cannot occur | |
| Invalid | FlushReq | Return FlushAck | Invalid |
| Invalid | Update | Return UpdateNack | Invalid |
| Invalid | FwdRead | Return FlushAck | Invalid |
| Invalid | FwdReadShared | Return FlushAck | Invalid |
| Invalid | FwdGet | Return FlushAck | Invalid |
| Invalid | Inval | Return InvalAck | Invalid |
| Invalid | GetResp | Send ReadResp to proc., --rc, if C == 1, then --wc | Invalid |
| Dirty | Read | Return ReadResp, set inclusion bit | Dirty |
| Dirty | ReadUC | Return ReadResp | Dirty |
| Dirty | ReadShared | Return ReadResp, set inclusion bit | Dirty |
| Dirty | ReadUCShared | Return ReadResp | Dirty |
| Dirty | ReadMod | Return ReadResp, set inclusion bit | Dirty |
| Dirty | ReadNA | Return ReadResp | Dirty |
| Dirty | SWrite | Send Inval to any other procs in inclusion mask (clear those bits), write data in Ecache | Dirty |
| Dirty | SWriteNA | Send Inval to any other procs in inclusion mask (clear those bits), write data in Ecache | Dirty |
| Dirty | VWrite | Send Inval to any other procs in inclusion mask (clear all bits) | WaitForVData |
| Dirty | VWriteNA | Send Inval to any other procs in inclusion mask (clear all bits) | WaitForVData |
| Dirty | VWriteData | Recycle (can only happen when waking up replay queue) | Dirty |
| Dirty | ReadSharedResp | Cannot occur | |
| Dirty | ReadExclResp | Cannot occur | |
| Dirty | FlushReq | Send Inval to any procs in inclusion mask (clear all bits), send SupplyDirtyInv to directory | Invalid |
| Dirty | Update | Send Inval to any procs in inclusion mask (clear all bits), write data in Ecache, return UpdateAck | Dirty |
| Dirty | FwdRead | Send Inval to any procs in inclusion mask (clear all bits), return SupplyDirtyInv | Invalid |
| Dirty | FwdReadShared | Return SupplyDirtySh | ShClean |
| Dirty | FwdGet | Return SupplyExcl | Dirty |
| Dirty | Inval | Return InvalAck (Inval was from when this Ecache obtained the line) | Dirty |
| Dirty | GetResp | Send ReadResp to proc., --rc, if C == 1, then --we | Dirty |
| ExClean | Read | Return ReadResp, set inclusion bit | ExClean |
| ExClean | ReadUC | Return ReadResp | ExClean |
| ExClean | ReadShared | Return ReadResp, set inclusion bit | ExClean |
| ExClean | ReadUCShared | Return ReadResp | ExClean |
| ExClean | ReadMod | Return ReadResp, set inclusion bit | ExClean |
| ExClean | ReadNA | Return ReadResp | ExClean |
| ExClean | SWrite | Send Inval to any other procs in inclusion mask (clear those bits), write data in Ecache | Dirty |

TABLE 11-continued

Ecache State Actions on Message Events

| Old Ecache State | Message from P or M chip | Action | New Ecache State |
|---|---|---|---|
| ExClean | SWriteNA | Send Inval to any other procs in inclusion mask (clear those bits), write data in Ecache | Dirty |
| ExClean | VWrite | Send Inval to any other procs in inclusion mask (clear all bits) | WaitForVData |
| ExClean | VWriteNA | Send Inval to any other procs in inclusion mask (clear all bits) | WaitForVData |
| ExClean | VWriteData | Cannot occur | |
| ExClean | ReadSharedResp | Cannot occur | |
| ExClean | ReadExclResp | Cannot occur | |
| ExClean | FlushReq | Send Inval to any procs in inclusion mask (clear all bits), send SupplyInv to directory | Invalid |
| ExClean | Update | Send Inval to any procs in inclusion mask (clear all bits), write data in Ecache, return UpdateAck | Dirty |
| ExClean | FwdRead | Return SupplySh | ShClean |
| ExClean | FwdReadShared | Return SupplySh | ShClean |
| ExClean | FwdGet | Return SupplyExcl | ExClean |
| ExClean | Inval | Return InvalAck (Inval was from when this Ecache obtained the line) | ExClean |
| ExClean | GetResp | Send ReadResp to proc., --rc, if C == 1, then --wc | ExClean |
| ShClean | Read | Return ReadResp, set inclusion bit | ShClean |
| ShClean | ReadUC | Return ReadResp | ShClean |
| ShClean | ReadShared | Return ReadResp, set inclusion bit | ShClean |
| ShClean | ReadUCShared | Return ReadResp | ShClean |
| ShClean | ReadMod | Send ReadMod to directory, ++rc, ++wc, set inclusion bit | PendingReq |
| ShClean | ReadNA | Return ReadResp | ShClean |
| ShClean | SWrite | Send Inval to any other procs in inclusion mask (clear those bits), Send ReadMod to directory, ++rc, ++wc, write Ecache and mask to potentially merge in response data | PendingReq |
| ShClean | SWriteNA | Send Inval to any other procs in inclusion mask (clear those bits), Send ReadMod to directory, ++rc, ++wc, write Ecache and mask to potentially merge in response data | PendingReq |
| ShClean | VWrite | Send Inval to any other procs in inclusion mask (clear all bits), Send ReadMod to directory, ++rc, ++wc | PendingReq |
| ShClean | VWriteNA | Send Inval to any other procs in inclusion mark (clear all bits), Send ReadMod to directory, ++rc, ++wc | PendingReq |
| ShClean | VWriteData | Cannot occur | |
| ShClean | ReadSharedResp | Cannot occur | |
| ShClean | ReadExclResp | Cannot occur | |
| ShClean | FlushReq | Cannot occur | |
| ShClean | Update | Cannot occur | |
| ShClean | FwdRead | Cannot occur | |
| ShClean | FwdReadShared | Cannot occur | |
| ShClean | FwdGet | Cannot occur | |
| ShClean | Inval | Send Inval to any procs in inclusion mask (clear all bits), return InvalAck | Invalid |
| ShClean | GetResp | Send ReadResp to proc., --rc, if C == 1, then --wc | ShClean |
| PendingReq | Read | Stall request | PendingReq |
| PendingReq | ReadUC | Stall request | PendingReq |
| PendingReq | ReadShared | Stall request | PendingReq |
| PendingReq | ReadUCShared | Stall request | PendingReq |
| PendingReq | ReadMod | Stall request | PendingReq |
| PendingReq | ReadNA | Stall request | PendingReq |
| PendingReq | SWrite | Stall request | PendingReq |
| PendingReq | SWriteNA | Stall request | PendingReq |
| PendingReq | VWrite | Stall request | PendingReq |
| PendingReq | VWriteNA | Stall request | PendingReq |
| PendingReq | VWriteData | Stall request | PendingReq |
| PendingReq | ReadSharedResp | Write Ecache, service stalled processor request, --rc | ShClean |
| PendingReq | ReadExclResp | If processor request was a scalar write, write Ecache except for word written by scalar write, --rc, if C == 1, then --wc | Dirty |
| | | If processor request was a vector write, write Ecache, --rc, if C == 1, then --wc | WaitForVData |
| | | Else, write Ecache, service stalled processor request; --rc, if C == 1, then --wc | ExClean |
| PendingReq | FlushReq | Return FlushAck | PendingReq |
| PendingReq | Update | Return UpdateNack | PendingReq |
| PendingReq | FwdRead | Return FlushAck | PendingReq |
| PendingReq | FwdReadShared | Return FlushAck | PendingReq |
| PendingReq | FwdGet | Return FlushAck | PendingReq |

TABLE 11-continued

Ecache State Actions on Message Events

| Old Ecache State | Message from P or M chip | Action | New Ecache State |
|---|---|---|---|
| PendingReq | Inval | Send Inval to any procs in inclusion mask (clear all bits), return InvalAck | PendingReq |
| PendingReq | GetResp | Send ReadResp to proc., --rc, if C == 1, then --wc | PendingReq |
| WaitForVData | Read | Stall request | WaitForVData |
| WaitForVData | ReadUC | Stall request | WaitForVData |
| WaitForVData | ReadShared | Stall request | WaitForVData |
| WaitForVData | ReadUCShared | Stall request | WaitForVData |
| WaitForVData | ReadMod | Stall request | WaitForVData |
| WaitForVData | ReadNA | Stall request | WaitForVData |
| WaitForVData | SWrite | Stall request | WaitForVData |
| WaitForVData | SWriteNA | Stall request | WaitForVData |
| WaitForVData | VWrite | Stall request | WaitForVData |
| WaitForVData | VWriteNA | Stall request | WaitForVData |
| WaitForVData | VWriteData | Write Ecache, if the cache index is marked as waiting for vector data, then un-mark it | Dirty |
| WaitForVData | ReadSharedResp | Cannot occur | |
| WaitForVData | ReadExclResp | Cannot occur | |
| WaitForVData | FlushReq | Return SupplyDirtyInv | WFVDInvalid |
| WaitForVData | Update | Write data in Ecache, return UpdateAck | WaitForVData |
| WaitForVData | FwdRead | Return SupplyDirtyInv | WFVDInvalid |
| WaitForVData | FwdReadShared | Return SupplyDirtyInv | WFVDInvalid |
| WaitForVData | FwdGet | Return SupplyExcl | WaitForVData |
| WaitForVData | Inval | Return InvalAck (Inval was from when this Ecache obtained the line) | WaitForVData |
| WaitForVData | GetResp | Send ReadResp to proc, --rc, if C == 1, then --wc | WaitForVData |
| WFVDInvalid | Read | Stall request | WFVDInvalid |
| WFVDInvalid | ReadUC | Stall request | WFVDInvalid |
| WFVDInvalid | ReadShared | Stall request | WFVDInvalid |
| WFVDInvalid | ReadUCShared | Stall request | WFVDInvalid |
| WFVDInvalid | ReadMod | Stall request | WFVDInvalid |
| WFVDInvalid | ReadNA | Stall request | WFVDInvalid |
| WFVDInvalid | SWrite | Stall request | WFVDInvalid |
| WFVDInvalid | SWriteNA | Stall request | WFVDInvalid |
| WFVDInvalid | VWrite | Stall request | WFVDInvalid |
| WFVDInvalid | VWriteNA | Stall request | WFVDInvalid |
| WFVDInvalid | VWriteData | Send Put to directory, ++wc, if the cache index is marked as waiting for vector data, then un-mark it | Invalid |
| WFVDInvalid | ReadSharedResp | Cannot occur | |
| WFVDInvalid | ReadExclResp | Cannot occur | |
| WFVDInvalid | FlushReq | Cannot occur | |
| WFVDInvalid | Update | Cannot occur | |
| WFVDInvalid | FwdRead | Cannot occur | |
| WFVDInvalid | FwdReadShared | Cannot occur | |
| WFVDInvalid | FwdGet | Cannot occur | |
| WFVDInvalid | Inval | Cannot occur | |
| WFVDInvalid | GetResp | Cannot occur | |

New processor requests may require allocating a new Ecache line (this is indicated in Table 11 by transitioning from the Invalid state to the Pending Req state), which may require evicting an existing line. Table 12 lists the actions necessary to evict a line from the Ecache. Lines that are pending (PendingReq, WaitForVData or WFVDInvalid state) cannot be evicted until they become quiescent.

TABLE 12

Ecache Evictions

| State of Ecache Line to Evict | Action |
|---|---|
| Invalid | Nop |
| ShClean | Send Inval to any procs in inclusion mask, send Drop to directory. |
| ExClean | Send Inval to any procs in inclusion mask, send Notify to directory. |
| Dirty | Send Inval to any procs in inclusion mask, send WriteBack to directory. |

TABLE 12-continued

Ecache Evictions

| State of Ecache Line to Evict | Action |
|---|---|
| PendingReq, WaitForVData, WFVDInvalid | Cannot evict; if both ways are pending, stall new request. |

The action "stall request" means that the request queue could be stalled in place until the request can be serviced and the protocol would still work (that is, there would be no deadlock). For performance reasons, the implementation will use a replay queue, and requests that cannot be serviced will be shunted in to the replay queue, allowing requests behind the stalled request to be serviced. This introduces some subtle issues regarding request ordering.

Any processor request, including non-allocating requests, that misses in the Ecache but finds both ways currently pending will be placed in to the replay queue. This ensures that it will remain ordered with any other previous requests to the same line that may have been placed into the replay queue due to the inability to allocate a new line.

When a pending line becomes quiescent again, due to a VWriteData or directory response packet, the replay queue is immediately interrogated with an associative lookup, and all potentially matching requests (based on a partial address compare) are replayed, in order. This ensures that no new requests from the processor request queue can access a newly quiescent line and pass earlier requests to the same line that were placed in the replay queue.

The replay queue includes logic to optimize replaying of multiple, queued VWrite and VWriteData packets. Due to the decoupled nature of vector writes, a series of allocating vector writes to the same line will likely get placed into the replay queue with the VWrite packets all ahead of the VWriteData packets (rather than interleaved as VWrite, matching VWriteData, VWrite, matching VWriteData, etc.). Since only the matching VWriteData packet can be accepted after a VWrite request (as the line will now be in WaitForVData state), it would be inefficient to play all requests in order from the replay queue, since that would cause the entire queue to be circulated for each VWrite/VWriteData pair. Instead, after processing a VWrite packet, the replay engine switches to replaying just the VWriteData packets. After processing a VWriteData data packet, it switches back to replaying the other types of requests.

Non-allocating vector writes (VWriteNA packets and their corresponding VWriteData packets) do not participate in this switching algorithm, because a VWriteNA will not necessarily cause a transition to WaitForVData state. Thus, after processing a VWriteNA request, the replay logic continues playing "regular" requests, and VWriteData packets belonging to non-allocating vector stores are replayed along with the regular requests. There can be at most one VWriteNA and corresponding VWriteData packet in the replay queue, due to the non-allocating vector write ordering logic.

Directory State Transitions

Table 13 summarizes the directory actions taken as a result of message events.

For all state transitions that return data to the requesting Ecache, and some others, the state transition action requires that a request be made to the memory manager. The directory engine creates a packet header, and then passes it on the memory manager, which accesses memory and typically sends the packet out to the network when it is ready. In some cases, the action requires the memory manager to "check back." This is done to provide ordering between the messages sent to the Ecaches by the memory manager and those sent by the directory engine.

When the memory manager must "check back," the directory goes into a transient state (PendMem*) and handles no other VN0 requests for this line until it receives the response from the memory manager. At this time, the directory knows that this, and any previous packets processed by the memory manager for this line will be ordered before any subsequent packets sent by the directory. State transitions for processing memory manager responses are shown in Table 14.

Each transient buffer (TB) entry contains a buffer capable of holding one cache line. This buffer is always marked empty when a TB entry is allocated, and can be filled (and marked full) by a WriteBack or a Supply message. The line buffer may subsequently be used to provide data for a request that had been placed in the replay queue.

A transient buffer entry persists as long as there are still requests for that line in the replay queue. The TB line buffer may be used to satisfy multiple requests from the replay queue, and actually provides a form a read combining if multiple MSPs try to read a line that was previously present in another MSP's cache. Any request that causes the value of the data buffer to become stale, however, will mark the line buffer as empty.

Accesses to MMRs on the local E chips are handled through the directory controller and transient buffer, so as to avoid having to implement VN0 from M to E and NV1 from E to M. The last four lines of Table 12 summarizes the directory actions for handling these E chip MMR accesses. They are handled much the same was as requests coming in to lines in the Exclusive state. The requests are forwarded to the local E chip on VN1, and the responses come back on VN2, where they are sunk by the transient buffer. The responses to the original requestor are then sent back on VN1.

TABLE 13

Directory Actions on Message Events

| Old Directory State | Message from Ecache x | Action | New Dir Info | New Directory State |
|---|---|---|---|---|
| Noncached | Read | If replaying and TB line buffer full, then mark TB line buffer empty, return a ReadExclResp (C = 0) | Ecache x | Exclusive |
| | | Else request that the memory manager return a ReadExclResp (C = 0) and check back | Ecache x | PendMemExclusive |
| Noncached | ReadShared | If replaying and TB line buffer full, then return a ReadSharedResp | Ecache x | Shared |
| | | Else request that the memory manager return a ReadSharedResp | Ecache x | Shared |
| Noncached | ReadMod | If replaying and TB line buffer full, then mark TB line buffer empty, return a ReadExclResp (C = 1) | Ecache x | Exclusive |
| | | Else request that the memory manager return a ReadExclResp (C = 1) and check back | Ecache x | PendMemExclusive |

TABLE 13-continued

Directory Actions on Message Events

| Old Directory State | Message from Ecache x | Action | New Dir Info | New Directory State |
|---|---|---|---|---|
| Noncached | Get | If replaying and TB line buffer full, then return a GetResp (C = 0) | None | Noncached |
| | | Else request that the memory manager return a GetResp (C = 0) | None | Noncached |
| Noncached | Put | Request that the memory manager write memory, return WriteComplete, if replaying, then mark TB line buffer empty | None | Noncached |
| Noncached | AMO | For result-returning AMOs (afadd, afax, acswap), request that the memory manager perform the AMO, and return a GetResp (C = 1), if replaying, then mark TB line buffer empty | None | Noncached |
| | | For store-only AMOs (aadd, aax), request that the memory manager perform the AMO, and return a WriteComplete, if replaying, then mark TB line buffer empty | None | Noncached |
| Noncached | Drop | Cannot occur | | |
| Noncached | WriteBack | Cannot occur | | |
| Noncached | Notify | Cannot occur | | |
| Noncached | SupplyInv | Cannot occur | | |
| Noncached | SupplyDirtyInv | Cannot occur | | |
| Noncached | SupplySh | Cannot occur | | |
| Noncached | SupplyDirtySh | Cannot occur | | |
| Noncached | SupplyExcl | Cannot occur | | |
| Noncached | FlushAck | Cannot occur | | |
| Noncached | UpdateAck | Cannot occur | | |
| Noncached | UpdateNack | Cannot occur | | |
| Noncached | InvalAck | Cannot occur | | |
| Shared | Read | If Ecache x's bit is not set in the sharing vector, and replaying with the TB line buffer full, then return a ReadSharedResp | Add Ecache x | Shared |
| | | If Ecache x's bit is not set in the sharing vector, and not replaying with the TB line buffer full, then ask memory manager to return a ReadSharedResp | Add Ecache x | Shared |
| | | If Ecache x's bit is set in the sharing vector (a Drop must be on its way), and replaying with the TB line buffer full, then return a ReadSharedResp | Remove Ecache x | PendDrop |
| | | If Ecache x's bit is set in the sharing vector (a Drop must be on its way), and not replaying with the TB line buffer full, then ask memory manager to return a ReadSharedResp, mark TB line buffer empty | Remove Ecache x | PendDrop |
| Shared | ReadShared | If Ecache x's bit is not set in the sharing vector, and replaying with the TB line buffer full, then return a ReadSharedResp | Add Ecache x | Shared |
| | | If Ecache x's bit is not set in the sharing vector, and not replaying with the TB line buffer full, then ask memory manager to return a ReadSharedResp | Add Ecache x | Shared |
| | | If Ecache x's bit is set in the sharing vector (a Drop must be on its way), and replaying with the TB line buffer full, then return a ReadSharedResp | Remove Ecache x | PendDrop |
| | | If Ecache x's bit is set in the sharing vector (a Drop must be on its way), and not replaying with the TB line buffer full, then ask memory manager to return a ReadSharedResp, mark TB line buffer empty | Remove Ecache x | PendDrop |
| Shared | ReadMod | Request that the memory manager return a ReadExclResp (C = 0) and check back, copy sharing vector into an invalidation engine entry, mark TB line buffer empty | Ecache x | PendMemInvWrite |
| Shared | Get | If replaying with a full TB line buffer, send a GetResp (C = 0), else ask the MM to send a GetResp (C = 0) | Same | Shared |
| Shared | Put | Request that the memory manager write memory and check back, copy sharing vector into an invalidation engine entry, mark TB line buffer empty | Ecache x | PendMemInvPut |

TABLE 13-continued

Directory Actions on Message Events

| Old Directory State | Message from Ecache x | Action | New Dir Info | New Directory State |
|---|---|---|---|---|
| Shared | AMO | For result-returning AMOs (afadd, afax, acswap), copy sharing vector into an invalidation engine entry, request that the memory manager perform the AMO, return a GetResp (C = 0) and check back, mark TB line buffer empty | Same (don't care) | PendMemInvPut |
| | | For store-only AMOs (aadd, aax), copy sharing vector into an invalidation engine entry, request that the memory manager perform the AMO and check back, mark TB line buffer empty | Same (don't care) | PendMemInvPut |
| Shared | Drop | Nop | Remove Ecache x | Shared |
| | | If clearing last bit in sharing vector | None | Noncached |
| Shared | WriteBack | Cannot occur | | |
| Shared | Notify | Cannot occur | | |
| Shared | SupplyInv | Cannot occur | | |
| Shared | SupplyDirtyInv | Cannot occur | | |
| Shared | SupplySh | Cannot occur | | |
| Shared | SupplyDirtySh | Cannot occur | | |
| Shared | SupplyExcl | Cannot occur | | |
| Shared | FlushAck | Cannot occur | | |
| Shared | UpdateAck | Cannot occur | | |
| Shared | UpdateNack | Cannot occur | | |
| Shared | InvalAck | Cannot occur | | |
| Exclusive | Read | Send FwdRead to owner, place request in replay queue, mark TB line buffer empty | Same | PendFwd |
| Exclusive | ReadShared | Send FwdReadShared to owner, place request in replay queue, mark TB line buffer empty | Same | PendFwd |
| Exclusive | ReadMod | Send FlushReq to owner, place request in replay queue, mark TB line buffer empty | Same | PendFwd |
| Exclusive | Get | If replaying and TB line buffer full, return a GetResp (C = 0), mark TB line buffer empty | Same | Exclusive |
| | | Else send FwdGet to owner, place request in replay queue, mark TB line buffer empty | Same | PendFwd |
| Exclusive | Put | Send Update to owner, mark TB line buffer empty | Same | PendFwd |
| Exclusive | AMO | Send FlushReq to owner, place request in replay queue, mark TB line buffer empty | Same | PendFwd |
| Exclusive | Drop | | | |
| Exclusive | WriteBack | Request that the memory manager write memory. Mark TB line buffer empty. | None | Noncached |
| Exclusive | Notify | Nop | None | Noncached |
| Exclusive | SupplyInv | Cannot occur | | |
| Exclusive | SupplyDirtyInv | Cannot occur | | |
| Exclusive | SupplySh | Cannot occur | | |
| Exclusive | SupplyDirtySh | Cannot occur | | |
| Exclusive | SupplyExcl | Cannot occur | | |
| Exclusive | FlushAck | Cannot occur | | |
| Exclusive | UpdateAck | Cannot occur | | |
| Exclusive | UpdateNack | Cannot occur | | |
| Exclusive | InvalAck | Cannot occur | | |
| PendInval* | Read | Stall VN0 | Same | Same |
| PendInval* | ReadShared | Stall VN0 | Same | Same |
| PendInval* | ReadMod | Stall VN0 | Same | Same |
| PendInval* | Get | Stall VN0 | Same | Same |
| PendInval* | Put | Stall VN0 | Same | Same |
| PendInval* | AMO | Stall VN0 | Same | Same |
| PendInval* | Drop | Nop | Same | Same |
| PendInval* | SupplyInv | Cannot occur | | |
| PendInval* | SupplyDirtyInv | Cannot occur | | |
| PendInval* | SupplySh | Cannot occur | | |
| PendInval* | SupplyDirtySh | Cannot occur | | |
| PendInval* | SupplyExcl | Cannot occur | | |
| PendInval* | FlushAck | Cannot occur | | |
| PendInval* | UpdateAck | Cannot occur | | |
| PendInval* | UpdateNack | Cannot occur | | |
| PendInvalPut | WriteBack | Cannot occur | | |
| PendInvalPut | Notify | Cannot occur | | |
| PendInvalPut | InvalAck | If inval counter > 1, then decrement counter | Same | PendInvalPut |
| | | If inval counter = 1, then send WriteComplete | None | Noncached |

TABLE 13-continued

Directory Actions on Message Events

| Old Directory State | Message from Ecache x | Action | New Dir Info | New Directory State |
|---|---|---|---|---|
| PendInvalWrite | WriteBack | Request that the memory manager write memory (from new owner) | Same | PendInvalPut |
| PendInvalWrite | Notify | Nop (from new owner) | Same | PendInvalPut |
| PendInvalWrite | InvalAck | If inval counter > 1, then decrement counter | Same | PendInvalWrite |
| | | If inval counter = 1, then send WriteComplete | Same | Exclusive |
| PendFwd | Read | Stall VN0 | Same | PendFwd |
| PendFwd | ReadShared | Stall VN0 | Same | PendFwd |
| PendFwd | ReadMod | Stall VN0 | Same | PendFwd |
| PendFwd | Get | Stall VN0 | Same | PendFwd |
| PendFwd | Put | Stall VN0 | Same | PendFwd |
| PendFwd | AMO | Stall VN0 | Same | PendFwd |
| PendFwd | Drop | Cannot occur | | |
| PendFwd | WriteBack | Write memory (implementation does not have time to write TB line buffer) | None | PendFwd |
| PendFwd | Notify | Nop | None | PendFwd |
| PendFwd | SupplyInv | Write TB line buffer, mark TB line buffer full | None | Noncached |
| PendFwd | SupplyDirtyInv | Write memory and TB line buffer, mark TB line buffer full | None | Noncached |
| PendFwd | SupplySh | Write TB line buffer, mark TB line buffer full | Ecache x | Shared |
| PendFwd | SupplyDirtySh | Write memory and TB line buffer, mark TB line buffer full | Ecache x | Shared |
| PendFwd | SupplyExcl | Write TB line buffer, mark TB line buffer full | Ecache x | Exclusive |
| PendFwd | FlushAck | Nop | None | Noncached |
| PendFwd | UpdateAck | Nop, send WriteComplete to Ecache that sent Put | Ecache x | Exclusive |
| PendFwd | UpdateNack | Write memory, send WriteComplete to Ecache that sent Put | None | Noncached |
| PendFwd | InvalAck | Cannot occur | | |
| PendDrop | Read | Stall VN0 | Same | PendDrop |
| PendDrop | ReadShared | Stall VN0 | Same | PendDrop |
| PendDrop | ReadMod | Stall VN0 | Same | PendDrop |
| PendDrop | Get | Stall VN0 | Same | PendDrop |
| PendDrop | Put | Stall VN0 | Same | PendDrop |
| PendDrop | AMO | Stall VN0 | Same | PendDrop |
| PendDrop | Drop | If Ecache x's bit is not set in the sharing vector, then this is the Drop we're waiting for . . . | Add Ecache x | Shared |
| | | If Ecache x's bit is set in the sharing vector, then this is a different Ecache . . . | Remove Ecache x | PendDrop |
| PendDrop | WriteBack | Cannot occur | | |
| PendDrop | Notify | Cannot occur | | |
| PendDrop | SupplyInv | Cannot occur | | |
| PendDrop | SupplyDirtyInv | Cannot occur | | |
| PendDrop | SupplySh | Cannot occur | | |
| PendDrop | SupplyDirtySh | Cannot occur | | |
| PendDrop | SupplyExcl | Cannot occur | | |
| PendDrop | FlushAck | Cannot occur | | |
| PendDrop | UpdateAck | Cannot occur | | |
| PendDrop | UpdateNack | Cannot occur | | |
| PendDrop | InvalAck | Cannot occur | | |
| PendMem* | Read | Stall VN0 | Same | Same |
| PendMem* | ReadShared | Stall VN0 | Same | Same |
| PendMem* | ReadMod | Stall VN0 | Same | Same |
| PendMem* | Get | Stall VN0 | Same | Same |
| PendMem* | Put | Stall VN0 | Same | Same |
| PendMem* | AMO | Stall VN0 | Same | Same |
| PendMem* | Drop | Nop | | |
| PendMem* | WriteBack | Cannot occur | | |
| PendMem* | Notify | Cannot occur | | |
| PendMem* | SupplyInv | Cannot occur | | |
| PendMem* | SupplyDirtyInv | Cannot occur | | |
| PendMem* | SupplySh | Cannot occur | | |
| PendMem* | SupplyDirtySh | Cannot occur | | |
| PendMem* | SupplyExcl | Cannot occur | | |
| PendMem* | FlushAck | Cannot occur | | |
| PendMem* | UpdateAck | Cannot occur | | |
| PendMem* | UpdateNack | Cannot occur | | |
| PendMem* | InvalAck | Cannot occur | | |
| — | Echip MMR Get | Allocate transient buffer entry and send Get to local E chip | — | — |

TABLE 13-continued

Directory Actions on Message Events

| Old Directory State | Message from Ecache x | Action | New Dir Info | New Directory State |
|---|---|---|---|---|
| — | Echip MMR Put | Allocate transient buffer entry and send Put to local E chip | — | — |
| — | GetResp | Send GetResp to original requestor and deallocate TB entry | — | — |
| — | WriteComplete | Send WriteComplete to original requestor and deallocate TB entry | — | — |

Certain requests made to the memory manager from the directory protocol engine can be marked to "check back" with the directory on their way out to the network. The associated memory line is always placed in one of the PendMem* states when such a request is outstanding. Table 14 lists the state transitions associated with processing the responses from the memory manager.

TABLE 14

Directory Actions on Responses from the Memory Manager

| Flavor of "PendMem*" Directory State | Response from Memory Controller | Action | New Dir Info | New Directory State |
|---|---|---|---|---|
| PendMemInvWrite | ReadExclResp | Send the ReadExclResp, send Invalidates | Ecache x, inval ctr | PendInvalWrite |
| PendMemInvWrite | other | | | |
| PendMemInvPut | Put Response | Discard the Put response, send Invalidates | Ecache x, inval ctr | PendInvalPut |
| PendMemInvPut | GetResp | Send the GetResp, send Invalidates | Ecache x, inval ctr | PendInvalPut |
| PendMemInvPut | other | | | |
| PendMemExclusive | ReadExclResp | Send the ReadExclResp | Same | Exclusive |
| PendMemExclusive | other | Cannot occur | | |

Directory Request Flow Control

The directory engines are not always capable of processing requests as fast as they arrive. When the directory bandwidth fails to keep up with the rate of incoming messages, the messages will collect in the input buffers, and may eventually cause back pressure on VN0 or VN2 in the interconnection network.

The VN0 network can also be stalled due to unavailability of resources that incoming VN0 requests may need. This is complicated by the fact that up to three requests may be in flight in the directory engine pipeline at one time, making it impossible to stop the pipeline abruptly in response to the state of the request currently being processed. The directory controller deals with this issue in a number of ways. These are briefly described here.

For resources that may fill up, but will eventually drain, the controller maintains a "high water mark" that is below the maximum capacity. When the resource fills to this level, new VN0 packets are held off. VN0 requests already in flight may fill up the remaining slots "above" the high water mark. When the resource frees to some "low water mark", the VN0 input is re-enabled. An example of this technique is the transient request buffer. Another is the VN1 response queue coming back from the memory manager.

A request may arrive that cannot be serviced because the corresponding cache line is in a transient state. In this case, the request is sent to a "replay queue", and a pointer into the replay queue is attached to the corresponding transient request buffer entry. When the transient state is resolved, the request is replayed from the replay queue. If there already exist one or more entries for this line in the replay queue, the request is added to the end of a linked list of such requests.

When a request arrives for a line that is not currently cached, a new directory entry may have to be allocated. The directory is 8-way set associative, so there are eight candidate locations for placing any new entry. Due to its size and associativity, the directories are able to contain entries for all cache lines contained in the four local Ecaches in the quiescent state. Therefore, typically, there will be a free (unused) location available among the eight when creating a new entry. However, it is possible for the caches to temporarily oversubscribe the directory. This can occur when a directory evicts a line, and then re-requests a new line that maps to the same directory index, and the new request arrives at the directory before the eviction notification (Notify, Drop or Writeback packet).

When the directory needs to allocate a new entry, but does not have a free way to use, it must wait for the Notify/Drop/Writeback packet that must be in flight to arrive and free up a way. In this case, the directory controller places the current request in the replay queue and shuts off new incoming VN0 requests. It then creates a special transient buffer entry to point to the request in the replay queue, and allocates a special widget to monitor the associated directory index. When a way becomes available, the widget marks the transient buffer as being ready to service, and it is then handled using the normal replay queue logic. The two VN0 requests in flight at the time VN0 was shut off may possibly have the same problem, so up to three monitoring widgets are available. When all set oversubscriptions have been handled, the VN0 input is re-enabled.

Figure 3:
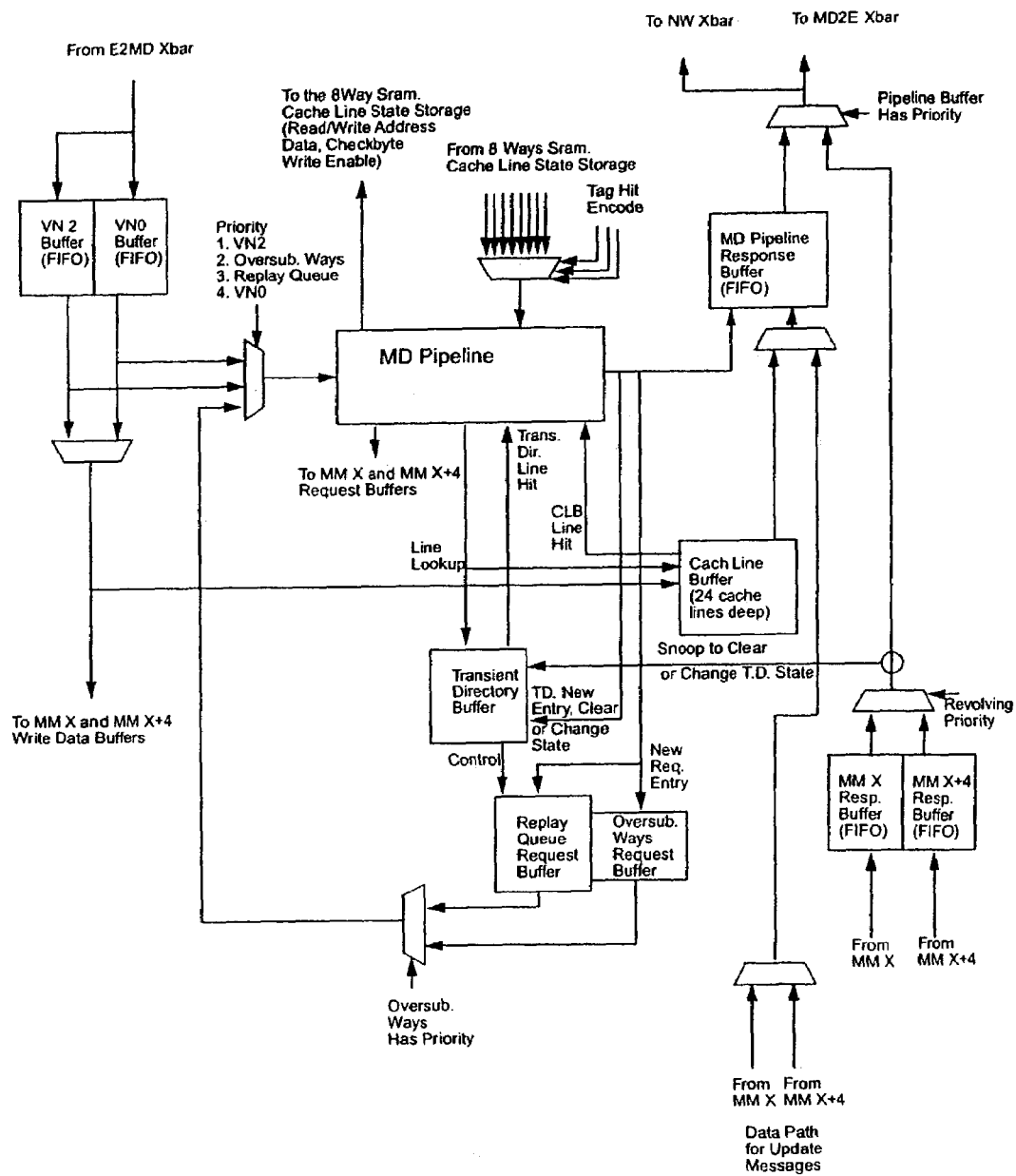
FIG. 3 depicts a block diagram of a memory directory, according to an embodiment of the invention.
Figure 4:
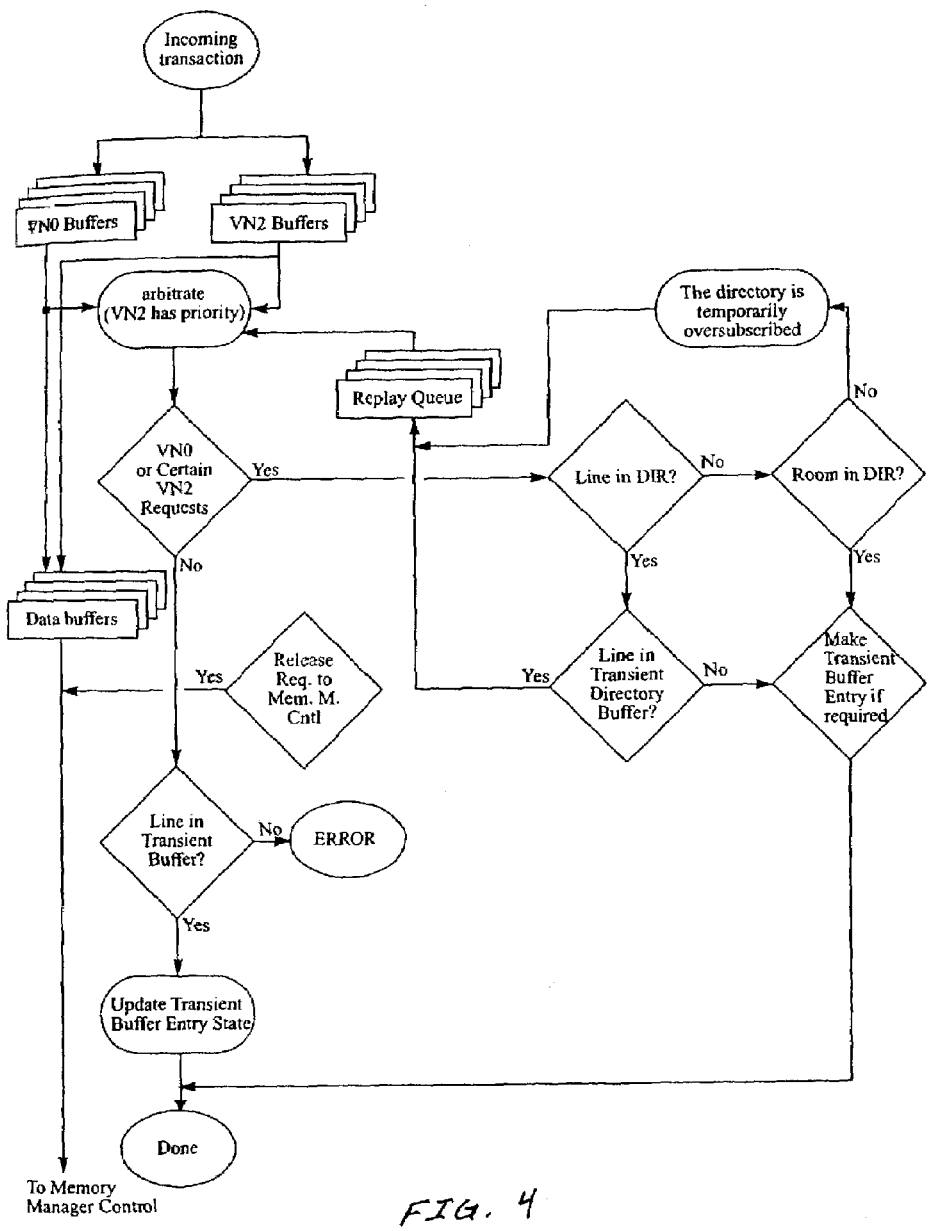
FIG. 4 depicts a flowchart of memory directory processing, according to an embodiment of the invention.

FIG. 3 depicts a block diagram of a memory directory, according to an embodiment of the invention, and FIG. 4 depicts a flowchart of memory directory processing, according to an embodiment of the invention. Incoming transactions are loaded into the VN0 and VN2 buffers from a port of the M chip crossbar. The request flow through the memory directory pertaining to the same cache line is processed in the same order as the packets are received from the M chip crossbar. The directory does not pass requests to the memory manager unless there is enough buffering in the memory directory's crossbar port DAMQ to hold the response. The memory directory is 8-way set associative. Each of the 4 E chips that connect to the M chip is 2-way set associative. The M chip therefore has just enough ways to hold the set, so no evictions are required. But, there is a possibility that a way could be temporarily oversubscribed. This happens when an E chip VN2 packet that changes a cache line state to non-cached is passed in the network by a packet from this same E chip that requires the memory director to store state in the same cache line set as the VN2 packet. When this happens, the memory directory will temporarily halt VN0 traffic until the VN2 packet for the cache line set that caused the oversubscribed ways is received by the memory directory pipeline. The memory directory stores a 4-bit vector that indicates which of the 4 MSPs in this coherence domain have this particular cache line cached.

Figure 5:
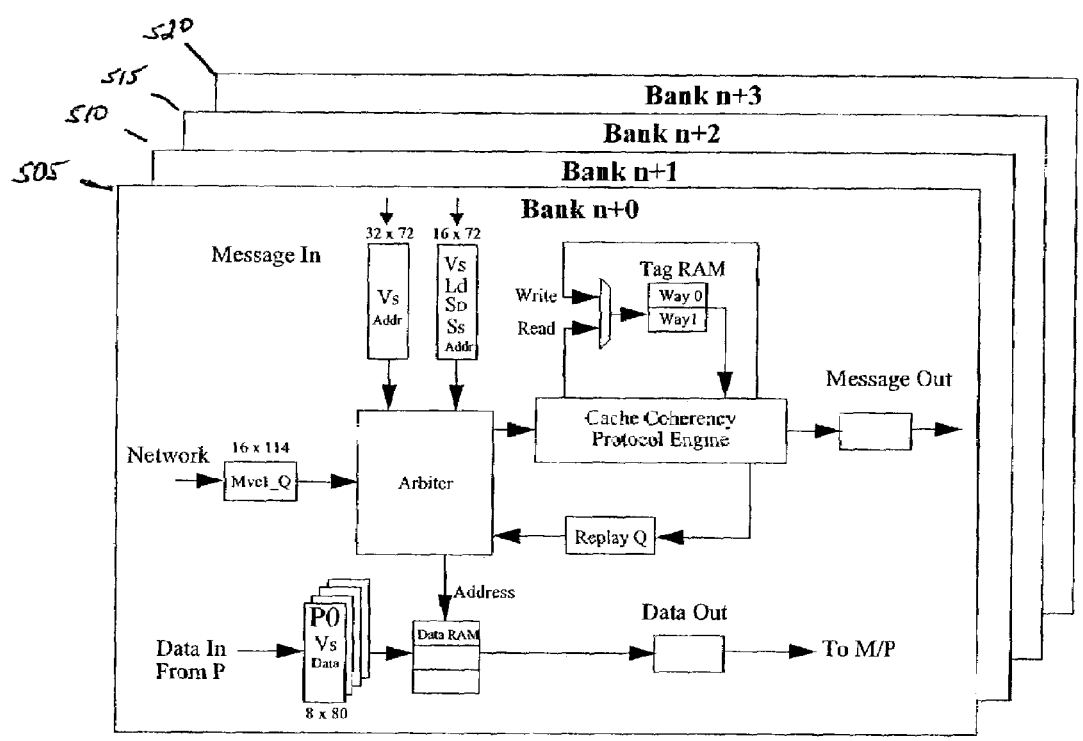
FIG. 5 depicts a block diagram of a cache, according to an embodiment of the invention.

FIG. 5 depicts a block diagram of an Ecache, according to an embodiment of the invention. Although 4 banks 505, 510, 515, and 520 are shown in FIG. 5, in another embodiment 16 banks may be present. In still another embodiment, any appropriate number of banks may be present. In an embodiment, each bank contains two ways. In an embodiment, each way stores 32 byte cache lines of data, a cache tag, and a state register associated with each cache line. Basic cache operation is to take an incoming message and address and read a cache set, and then take an action based on the incoming message and the cache set it addressed. A replay queue may be used for requests that cannot proceed until a previous cache line transaction completes. One type of action that can be initiated by an incoming message is to make a request to memory. The request is sent to the M chip interface where it is determined whether the request will generate a response. If it does, local information is stored in a transient response buffer. The returned response is matched to an entry in the transient response buffer.

The banks also have four buffers for vector store data. The bank arbiter keeps track of how many words are in each of these buffers. When the number of words in the data buffer satisfies the number of words in the request mask, the request may be removed from the vector store queue.

Since vector store requests are written into both queues, vector store requests can be removed from the load/store queue, can make appropriate M chip requests, and can cause state actions prior to vector store data arriving. This reduces vector store latency if the vector store request did not hit in the cache. If the response has not been returned form the M chip when the request is removed from the vector store queue, the vector store request will be placed in a replay queue and processed again later. Vector store requests cannot pass other store requests in the vector store queue even if the data for the later store request is present.

Advantages

In an embodiment, a cache coherence mechanism supports high bandwidth memory references. Using a highly-banked implementation with multiple coherence engines at each node and on-chip directory caches, the throughput of coherence transactions is greater than convention coherence mechanisms that store their directory information in DRAM. In an embodiment, the cache coherence mechanism provides efficient communication between processors, and data is transferred only once across the machine and is cached only where it is consumed.

In the previous detailed description of exemplary embodiments of the invention, reference was made to the accompanying drawings (where like numbers represent like elements), which form a part hereof, and in which was shown by way of illustration specific exemplary embodiments in which the invention may be practiced. These embodiments were described in sufficient detail to enable those skilled in the art to practice embodiments of the invention, but other embodiments may be utilized and logical, mechanical, electrical, and other changes may be made without departing from the scope of the present invention. The previous detailed description is, therefore, not to be taken in a limiting sense, and the scope of embodiments of the present invention is defined only by the appended claims.

Numerous specific details were set forth to provide a thorough understanding of embodiments of the invention. However, embodiments of the invention may be practiced without these specific details. In other instances, well-known circuits, structures and techniques have not been shown in detail in order not to obscure embodiments of the invention.

What is claimed is:

1. A method for performing a coherence protocol in a shared-memory multiprocessor employing a directory-based cache coherence mechanism, comprising:
   when a current cache-line state is noncached, transitioning to an exclusive clean state when a read to a line is performed by a processor;
   when the current cache-line state is exclusive-clean at a second processor, transitioning to a shared state when the read to the line is performed by the processor;
   when the current cache-line state is dirty at the second processor, transitioning to the exclusive-clean state when the read to the line is performed by the processor; and
   when the current cache-line state is shared, remaining in the shared state when the read to the line is performed by the processor.

2. The method of claim 1, further comprising:
   processing a shared hint for read requests.

3. The method of claim 2, wherein the processing further comprises:
   when the current cache-line state is noncached, transitioning to the shared state when a read-shared-hint is requested by the processor;
   when the current cache-line state is exclusive-clean at the second processor, transitioning to the shared state when the read-shared-hint is requested by the processor;
   when the current cache-line state is dirty at the second processor, transitioning to the shared state when the read-shared-hint is requested by the processor; and
   when the current cache-line state is shared, remaining in the shared state when the read-shared-hint is requested by the processor.

4. The method of claim 1, further comprising:
   processing a non-allocate read request;
   processing a non-allocate write request; and
   processing a read-modify-write atomic operation.

5. The method of claim 4, wherein the processing the non-allocate read request further comprises:
   when the current cache-line state is noncached, remaining in the noncached state when the non-allocate read to the line is performed by the processor;

when the current cache-line state is exclusive-clean at the second processor, remaining in the exclusive-clean state at the second processor when the non-allocate read to the line is performed by the processor;

when the current cache-line state is dirty at the second processor, remaining in the dirty state at the second processor when the non-allocate read to the line is performed by the processor; and when the current cache-line state is shared, remaining in the shared state when the non-allocate read to the line is performed by the processor.

6. The method of claim 4, wherein the processing the non-allocate write request further comprises:

when the current cache-line state is noncached, remaining in the noncached state when a non-allocate write to the line is requested by the processor;

when the current cache-line state is exclusive-clean at the second processor, transitioning to the dirty state at the second processor when the non-allocate write to the line is requested by the processor;

when the current cache-line state is dirty at the second processor, remaining in the dirty state at the second processor when the non-allocate write to the line is requested by the processor; and when the current cache-line state is shared, transitioning to the noncached state when the non-allocate write to the line is requested by the processor.

7. The method of claim 4, wherein the processing the read-modify-write atomic operation further comprises:

when the current cache-line state is noncached, remaining in the noncached state when the read-modify-write atomic operation to the line is requested by the processor;

when the current cache-line state is exclusive-clean at the second processor, transitioning to the noncached state when the read-modify-write atomic operation to the line is requested by the processor;

when the current cache-line state is dirty at the second processor, transitioning to the noncached state when the read-modify-write atomic operation to the line is requested by the processor; and when the current cache-line state is shared, transitioning to the noncached state when the read-modify-write atomic operation to the line is requested by the processor.

* * * * *

UNITED STATES PATENT AND TRADEMARK OFFICE
CERTIFICATE OF CORRECTION

PATENT NO. : 7,082,500 B2
APPLICATION NO. : 10/368090
DATED : July 25, 2006
INVENTOR(S) : Scott et al.

It is certified that error appears in the above-identified patent and that said Letters Patent is hereby corrected as shown below:

Title page 2, in field (56), under "Other Publications", in column 2, lines 7-8, below "5,(1993),pp. 520-534." delete "Scale Multiprocessors, IEEE Transactions on Parallel and Distributed Systems, vol. 4, No. 5, (1993), pp. 520-534." (Repeated Entry)

In column 1, line 34, delete "processors's" and insert -- processor's --, therefor.

In column 2, line 44, after "processors" insert -- 119 --.

In column 2, line 53, after "chip" insert -- 115 --.

In column 3, line 52, after "attribute" insert -- number 1 above, VN2 --.

In column 5, line 27, after "invalid state)" insert -- . --.

In column 6, line 12, after "invalid state)" insert -- . --.

In column 6, line 40, after "Noncached)" insert -- . --.

In column 6, line 42, after "Exclusive)" insert -- . --.

In column 6, line 53, delete "PendMemExculsive" and insert -- PendMemExclusive --, therefor.

In column 7, line 6, after "(scalar load)" insert -- . --.

In column 7, line 18, after "request)" insert -- . --.

In column 8, line 11, after "invalid" insert -- . --.

In column 8, line 12, after "invalid" insert -- . --.

In column 8, line 13, after "shared" insert -- . --.

In column 8, line 14, after "shared" insert -- . --.

In column 8, line 17, after "dirty)" insert -- . --.

In column 8, line 47, after "bit)" insert -- . --.

UNITED STATES PATENT AND TRADEMARK OFFICE
CERTIFICATE OF CORRECTION

PATENT NO. : 7,082,500 B2
APPLICATION NO. : 10/368090
DATED : July 25, 2006
INVENTOR(S) : Scott et al.

It is certified that error appears in the above-identified patent and that said Letters Patent is hereby corrected as shown below:

In column 8, line 49, after "bit)" insert -- . --.

In columns 11-12, line 7 (Under Sub-Heading -Action), delete "we" and insert -- wc --, therefor.

In columns 11-12, line 66 (Under Sub-Heading -Action), delete "we" and insert -- wc--, therefor.

In column 26, line 64, delete "oversubsciptions" and insert -- oversubscriptions --, therefor.

In column 28, line 31, in Claim 1, delete "exclusive clean" and insert -- exclusive-clean --, therefor.

Signed and Sealed this

Twenty-sixth Day of December, 2006

JON W. DUDAS
*Director of the United States Patent and Trademark Office*